United States Patent
Fujimaki et al.

(10) Patent No.: US 7,210,868 B2
(45) Date of Patent: May 1, 2007

(54) PRINTER

(75) Inventors: Atsushi Fujimaki, Nagano (JP); Osamu Azami, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/766,330

(22) Filed: Jan. 29, 2004

(65) Prior Publication Data

US 2004/0258445 A1    Dec. 23, 2004

(30) Foreign Application Priority Data

Jan. 31, 2003    (JP)    ............................ P2003-024470
Jan. 31, 2003    (JP)    ............................ P2003-024471
Jan. 31, 2003    (JP)    ............................ P2003-024472

(51) Int. Cl.
    *B41J 5/30*    (2006.01)
(52) U.S. Cl. ............................ 400/62; 400/61; 400/76; 358/1.15; 358/1.16
(58) Field of Classification Search .................. 400/76, 400/70, 61; 358/1.9, 1.13, 1.15–1.16
    See application file for complete search history.

(56) References Cited

U.S. PATENT DOCUMENTS

| | | | | |
|---|---|---|---|---|
| 5,177,603 A | * | 1/1993 | Kojima | .................. 358/518 |
| 6,047,146 A | * | 4/2000 | Ito et al. | ........................ 399/54 |
| 6,082,847 A | * | 7/2000 | Nishinohara et al. | ......... 347/19 |
| 6,473,191 B2 | * | 10/2002 | Kohno | .................... 358/1.13 |
| 6,611,355 B1 | * | 8/2003 | Kizawa | ..................... 358/1.9 |
| 2002/0093555 A1 | * | 7/2002 | Kobayashi et al. | ........... 347/86 |

FOREIGN PATENT DOCUMENTS

| | | | |
|---|---|---|---|
| EP | 1219441 A2 | * | 7/2002 |
| JP | 62236745 A | * | 10/1987 |
| JP | 05-053391 A | | 3/1993 |
| JP | 05-096818 A | | 4/1993 |
| JP | 09193514 A | * | 7/1997 |
| JP | 11-005334 A | | 1/1999 |
| JP | 11-203231 A | | 7/1999 |
| JP | 2000-163236 A | | 6/2000 |
| JP | 2000-185440 A | | 7/2000 |
| JP | 2001-277667 A | | 10/2001 |
| JP | 2002281212 A | * | 9/2002 |
| JP | 2002-192810 A | | 10/2002 |
| JP | 2003-025687 A | | 1/2003 |

* cited by examiner

*Primary Examiner*—Minh Chau
(74) *Attorney, Agent, or Firm*—Sughrue Mion, PLLC

(57) ABSTRACT

A printer includes: a print performing unit which can change a structure thereof and in which contents of an executable printing process change depending on the structure; an apparatus name information storing unit which stores a plurality of apparatus name information as identification information of the apparatus coordinated with the structure; and a request responding unit for transmitting the apparatus name information coordinated with the structure at that time when a prescribed request is received among the plurality of apparatus name information to an apparatus transmitting the request.

2 Claims, 6 Drawing Sheets

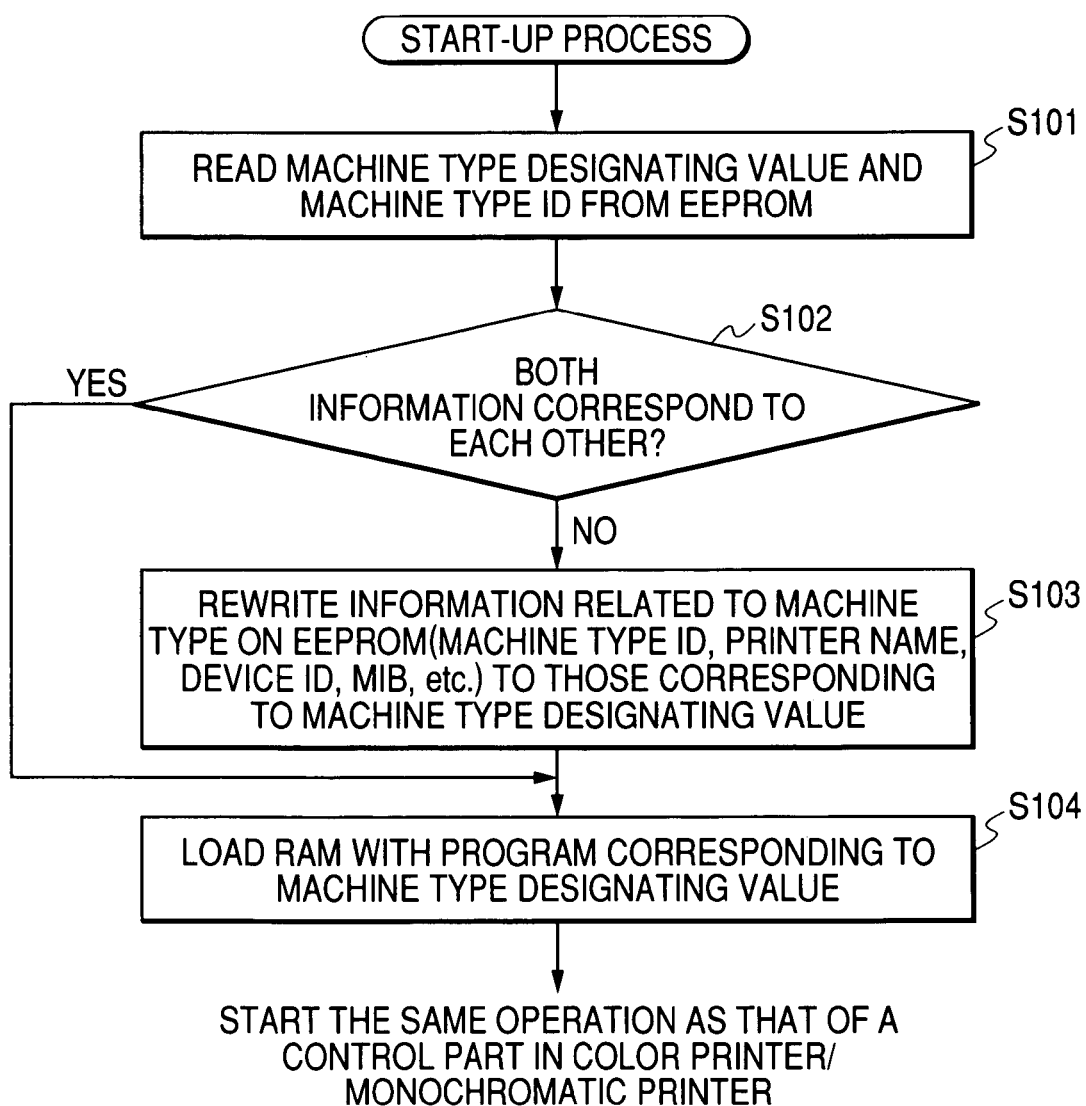

PRINTER

BACKGROUND OF THE INVENTION

The present invention relates to a printer.

As well-known, of devices performing a printing operation such as printers, copying machines, complex machines, etc. (refer them to as printers, hereinafter), there are devices capable of operating as devices in which the contents (kind, number) of an executable printing process are different by changing their structures (add optional components/change components).

Specifically, in existing printers, there are some printers capable of operating as color printers capable of a color printing and a monochromatic printing and as monochromatic printers capable of only a monochromatic printing by changing ink cartridges, printer heads, toner cartridges, etc (for instance, see JP-A-2002-192810). Further, there are some printers in which a staple process or a punch hole process may be carried out by adding a component called a finisher.

In the case that the printer as described above (designate it as a structure-changeable printer, hereinafter) is used in a network environment, for example, when the structure-changeable printer which has no function of a printer server is connected to and used in a network through the printer server or the like, and when the structure-changeable printer which has a function as the printer server is connected to and used in the network, a user may erroneously select the printer which cannot perform a printing operation of intended contents.

Specifically, information displayed on the display of a computer as the identification information of a network printer indicates a printer name outputted from each network printer (the structure-changeable printer). However, the structure-changeable printer serves as a printer in which kinds of executable processes are different depending on the structure at that time. Therefore, in the network to which the structure-changeable printer is connected, for example, the structure-changeable printer, which a user takes and selects as a color printer, may actually operate as a monochromatic printer. As a result, a situation that an intended printed result cannot be obtained (a color printing instructed to be performed finishes in an error, an instruction to perform a color printing cannot be outputted and a printed result different from an intended result is obtained) may occur.

Further, a window displayed by a program (what is called a printer driver) for operating the printer desirably includes no wasteful items (check boxes incapable of being selected, radio buttons, etc.) The existing structure-changeable printer is a printer in which such a program cannot be installed by a plug and play (a device interface standard which makes it possible to add an expansion card or the like to a system without requiring a manual setting of a user) This is because the existing structure-changeable printer serves as a printer for outputting the same device ID (information used as the identification information of the printer upon installing a program by a plug and play) without depending on the structure.

Beside, in order to reduce the design and production cost of the printers, the maker ordinarily designs a board for each printer in such a way that when a jumper line is attached to a board for one machine, the board functions as aboard for the other machine. Further, the maker forms extremely similar products as farm wares respectively for the printers.

Specifically, in the existing printers, there are some printers which can operate as printers of other types of machines (more functional printers) (in other words, an apparatus whose functions can be inexpensively improved) when an operation for attaching jumper lines and an operation for changing farm wares are carried out. However, since the existing printers are not designed so that an end user may perform an operation for attaching the jumper lines, the end user side extremely hardly improves the functions of the printers (changes the types of machines of the printers) by carrying out the above-described operations.

Beside, of a printer capable of only monochromatic printing (herein after referred as monochromatic printer), there are printers which, upon reception of print job data requesting (instructing) color printing, produce monochromatic printed material based on the received print job data without informing an error.

Conditions where the monochromatic printer receives the print job data requesting color printing occur when a user erroneously set a printing condition or install a printer driver not for the his/her printer. A monochromatic printed material produced by the monochromatic printer based on the printing job data requesting color printing is of a poor quality as compared with a monochromatic printed material produced bas on the printer job data requesting monochromatic printing.

SUMMARY OF THE INVENTION

In view of above, it is an object of the present invention to provide a printer in which the contents (kind, number) of an executable printing process are different by changing its structure, an erroneous selection can be prevented irrespective of a fact that a printing operation having intended contents cannot be performed, and a program corresponding to a structure at that time can be installed by a plug and play.

Another object of the present invention is to provide a printer whose type of machine can be easily changed by an end user and whose structure is easily designed.

Still another object of the present invention is to provide a printer capable of processing the print job data in a suitable state for the user.

In order to solve the aforesaid object, the invention is characterized by having the following arrangement.

(1) A printer comprising:

a print performing unit which can change a structure thereof and in which contents of an executable printing process change depending on the structure;

an apparatus name information storing unit which stores a plurality of apparatus name information as identification information of the apparatus coordinated with the structure; and a request responding unit for transmitting the apparatus name information coordinated with the structure at that time when a prescribed request is received among the plurality of apparatus name information to an apparatus transmitting the request.

(2) A printer according to (1), further comprising: a rewriteable storing unit which stores a machine type designating value as information for designating any of the apparatus name information stored in the apparatus name information storing unit, wherein the request responding unit transmits the information designated from the plurality of apparatus name information by the machine type designating value stored in the rewriteable storing unit to the apparatus which transmits the request when the request responding unit receives the prescribed request.

(3) A printer according to (2), further comprising: a rewriting unit for rewriting the machine type designating value stored in the storing unit to a value corresponding to a changed structure when the structure is changed.

(4) A printer comprising:
a print performing unit which can change a structure thereof and operates in either a state capable of a color printing or a state capable of only a monochromatic printing in accordance with the structure; and
an output request responding unit for transmitting a printer name corresponding to the operating state of the print performing unit to an apparatus outputting an output request when the output request responding unit receives the output request of the printer name.

(5) A printer comprising;
a print performing unit which can change a structure thereof and operates in either a state capable of a color printing or a state capable of only a monochromatic printing in accordance with the structure; and
an output request responding unit for transmitting a device ID corresponding to the operating state of the print performing unit to an apparatus outputting an output request when the output request responding unit receives the output request of the device ID.

(6) A printer according to (5), further comprising an output request responding unit for transmitting a device ID corresponding to the operating state of the print performing unit to an apparatus outputting an output request when the output request responding unit receives the output request of the device ID.

(7) A printer operating as any one of a plurality of kinds of machines, the printer comprising:
a rewriteable nonvolatile storing unit for storing first information used at any time when the printer operates as any of the plurality of kinds of machines and second information whose contents are to be rewritten depending on as which type of machines of the plurality of types of machines the printer operates; and
a control part for rewriting only the second information stored in the nonvolatile storing unit to information for a different machine unit when an operation is to be started for the different machine from the machine used up to that time.

(8) A printer according to (7), wherein the control part checks the structure of a self-device upon starting to determined whether or not the operation is to be started for the different machine from the machine used up to that time.

(9) A printer according to (7); wherein the first information is information related to the number of prints formed in the past.

(10) A printer comprising:
a printing unit for a monochromatic printing;
a receiving unit for receiving print job data;
a determining unit for determining whether the print job data received by the receiving unit is monochromatic print job data instructing a monochromatic printing or color printing job data instructing a color printing;
a printing control unit for processing the received print job data when the determining unit determines that the received print job data is the monochromatic print job data, and deleting the received print job data when the determining unit determines that the received print job data is the color print job data.

(11) A printer according to (10) further comprising an information transmitting unit for transmitting information representing that the determining unit determines that the received pint job data is the color print job data to a computer having a function of informing a user of a message corresponding to the information.

(12) A printer comprising:
a printing unit capable of operating in a first state capable of only a monochromatic printing and in a second state capable of a monochromatic printing and a color printing;
a receiving unit for receiving a print job data;
a determining unit for determining whether the print job data received by the receiving unit is monochromatic print job data instructing a monochromatic printing or color printing job data instructing a color printing; and
a printing control unit for causing the printing unit to produce a printed material corresponding to a determining result of the determining unit based on the print job data when the printing unit operates in the second state, and causing the printing unit to produce a monochromatic printed material based on the printing job data which is determined as the monochromatic printing job data by the determining unit and delete the printing job data which is determined as the color printing job data by the determining unit when the printing unit operates in the first state.

BRIEF DESCRIPTION OF THE DRAWINGS

FIG. 3 is a flow chart at the time of a start-up process executed by the printer according to the embodiment.

DETAILED DESCRIPTION OF PREFERRED EMBODIMENTS

Figure 1:
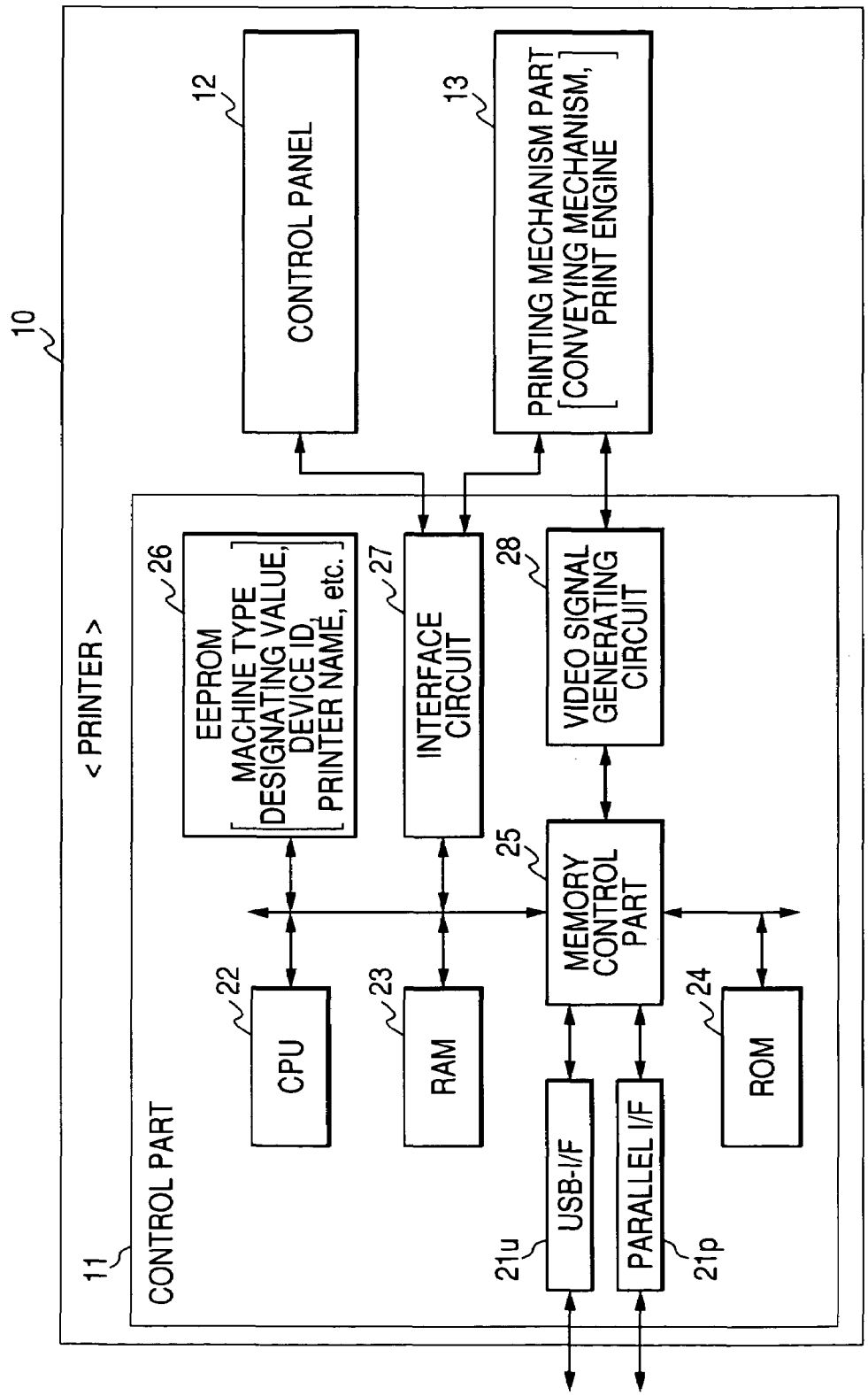
FIG. 1 is a block diagram of hardware of a printer of one embodiment according to the present invention.

Now, embodiments of the present invention will be described in detail by referring to the drawings.

Firstly, by referring to FIGS. 1 and 2, the summary of a printer 10 according to one embodiment of the present invention is described.

As shown in FIG. 1, the printer 10 according to this embodiment includes a control part 11, a control panel 12 and a printing mechanism part 13.

The control panel 12 constituting the printer 10 is an interface unit between a user and the printer 10 (control part 11). This control panel 12 constitutes the unit comprising a liquid crystal display and a plurality of pressing button switches or the like.

The printing mechanism part 13 is a unit comprising a printing engine for printing (forming an image) on a sheet in accordance with a video signal supplied from the control part 11, a sheet feeder for feeding sheets to the printing engine and a sheet ejector for ejecting printed sheets outside the printer 10, etc. The printing engine used in the printing mechanism part 13 can be used by setting four kinds of toner cartridges (C, M, Y and K toner cartridges) or can be used by setting only the K toner cartridge. The printing engine is a type that the toner cartridge is replaced by another toner cartridge while the power of the printer 10 is turned on (a printing engine in which the toner cartridge needs to be moved to a position where the toner cartridge can be replaced by another toner cartridge).

The control part 11 is a unit that performs a process for forming prints having contents corresponding to print job data received from a host computer in the printing mechanism part 13, a process for forming a status sheet in the printing mechanism part 13 and a process for returning various kinds of information managed by itself (mainly information on a below-described EEPROM 26) to a device requesting the information. Here, the host computer indicates a computer in which a printer driver (the detail thereof will be described below) for the printer 10 is installed.

As shown in the drawing, the control part 11 provided in the printer 10 is a unit in which a USB interface circuit (USB-I/F) 21u, a parallel interface circuit (parallel I/F) 21p, a CPU 22, a RAM 23, a ROM 24, a memory control part 25, an EEPROM 26, an interface circuit 27, and a video signal generating circuit 28, etc. are installed together. The control part 11 serves as a unit to which a network interface circuit or an HDD prepared as an option for the printer 10, the illustration of which is omitted, can be added.

All of the USB interface circuit 21u and the parallel interface circuit 21p and the network interface circuit which can optionally be added to the control part 11; which are referred as an interface circuit 21, hereinafter, which are used in the control part 11 perform a communication (receiving of print job data or the like) between the host computer and them.

The CPU 22 is a control circuit for generally controlling respective parts in the control part 11. The ROM 24 is a nonvolatile memory in which various kinds of programs (specifically described below) loaded in the RAM 23 and executed by the CPU 22 are stored in compressed states.

The interface circuit 27 is a circuit for carrying out a communication (transmit various kinds of instructions and receive information) between the control panel 12 and the printing mechanism part 13 and the interface circuit. The memory control part 25 is a circuit for carrying out a process for transferring information (print job data or the like) received by the interface circuit 21 to the CPU 22/RAM 23 and a process for transferring a kind of image data (refer it to as printing data, hereinafter) generated on the RAM 23 by the CPU 22 from the print job data to the video signal generating circuit 28. The video signal generating circuit 28 is a circuit for forming a video signal for operating the printing engine from the printing data (the printing data fed from the memory control part 25) formed by the CPU 22 and supplying the video signal to the printing engine.

The EEPROM 26 is a rewritable nonvolatile memory mounted on the printer 10 (control part 11) to store a machine type designating value, a machine type ID, a printer name, a device ID, panel setting information, an MIB (Management Information Base), color calibration data, a USB ID, the total number of times of printings, jam counts, the number of times of turning on a power, etc.

The machine type designating value stored in the EEPROM 26 indicates information taking either a value (refer it to as a designating value for color printing, hereinafter) under which the printer 10 is instructed to operate as a printer of a machine type capable of a color printing, or a value (refer it to as a designating value for monochromatic printing, hereinafter) under which the printer 10 is instructed to operate as a printer capable of only a monochromatic printing.

Further, the information (the machine type ID, the printer name, the device ID, the USB ID, the MIB, etc.) except the machine type designating value stored in the EEPROM 26 are respectively the same information (information returned by the control part 11 to an apparatus which transmits a command for requesting the information and used by the control part 11 upon printing the status sheet) as information having the same names or similar names stored in an existing printer which has a USB interface and supports a Device ID. A printer name, a device ID, panel setting information, an MIB, color calibration data (and a machine type ID) in the related printer are information incapable of being rewritten even when a toner cartridge is replaced by another toner cartridge. Contrary to this, the printer name, the device ID, the panel setting information, the MIB, and the color calibration data (refer these information to as information related to the machine type name, hereinafter) in the printer 10 according to the present invention are information capable of being rewritten when the toner cartridge is replaced by another toner cartridge.

Figure 2A:
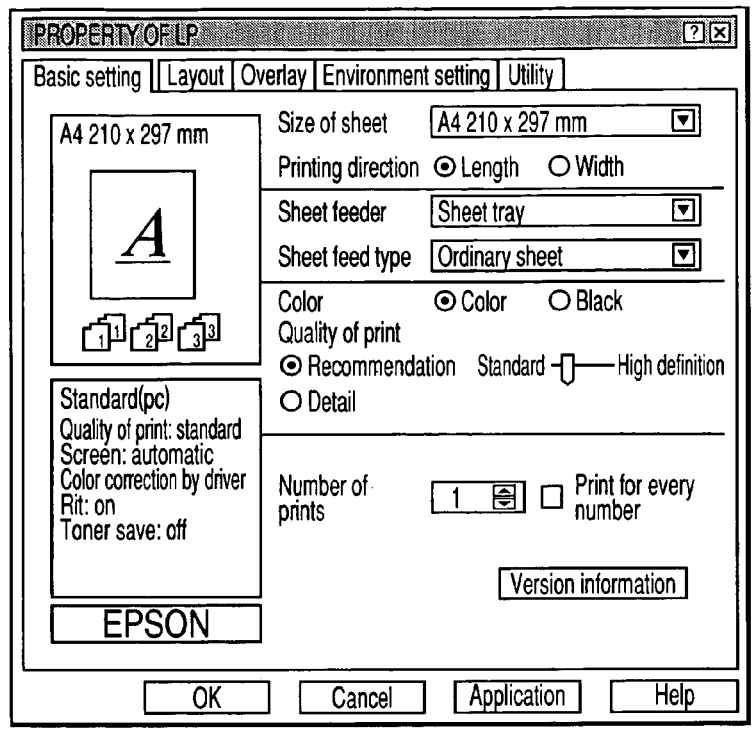
FIGS. 2A and 2B show explanatory views of property dialogue boxes displayed by two printer drivers prepared for the printer according to the embodiment.
Figure 2B:
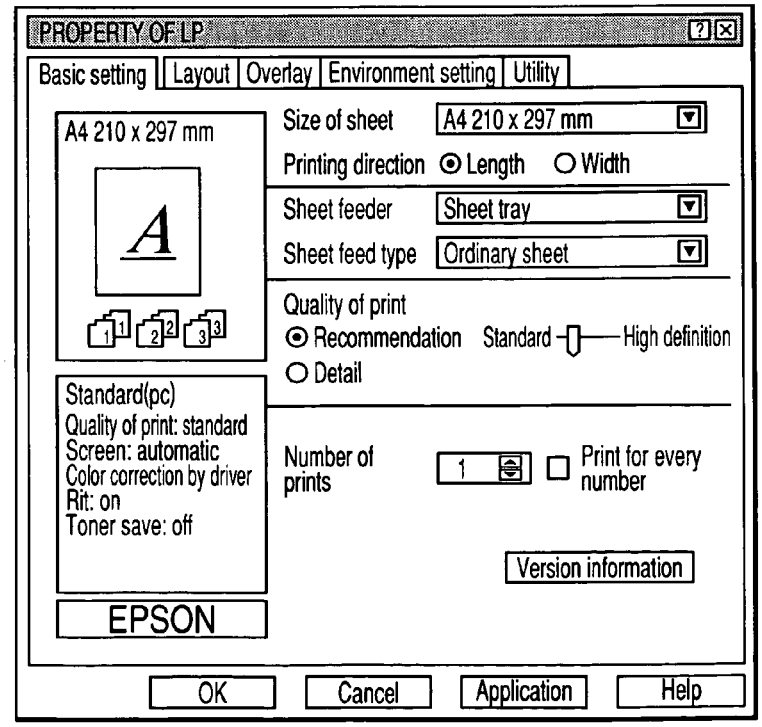

Then, in the printer 10 according to the present invention, a printer in which four kinds of toner cartridges are set in the printing mechanism part 13 and the machine type designating value is set to a designating value for color printing is sold as a color printer. Further, a printer in which only a K toner cartridge is set in the printing mechanism part 13 and the machine type designating value is set to a designating value for monochromatic printing is sold as a monochromatic printer. Further, in the printer 10, a printer driver displaying a property dialogue box as shown in FIG. 2A and a property dialogue box as shown in FIG. 2B (that is, items related to a color printing) and a monitor program for informing a user of the operating state (presence or absence of the generation of error/warning, etc.) of the printer 10 are prepared (formed). Further, the printer is sold in a form with a CD-ROM attached in which these programs are recorded. The monitor program for the printer 10 periodically transmits a status information request command for transmitting status information showing the operating state (the presence or absence of the generation of error/warning, etc.) to the printer 10 to grasp (monitor) the operating state of the printer 10. When the error/warning is generated in the printer 10, a window for informing the user of the generated error/warning is displayed.

In the printer 10 according to the present embodiment, the printing mechanism part 13 and a part of the control part 11 for controlling the printing mechanism part 13 correspond to the print performing unit of the present invention. The ROM 24 and the EEPROM 26 correspond to the apparatus name information storing unit. A part of the control part 11 for transmitting the device ID/computer name on the EEPROM 26 corresponds to the request responding unit.

Now, the structure and the operation of the printer 10 according to this embodiment will be more specifically described below by taking the above-described preconditions into consideration.

In the ROM 24 mounted on the printer 10 (control part 11) of the present invention, a common program, a program for a machine type exclusively used for a monochromatic printing, a program for a machine type capable of a color printing and a program for a plurality of functions are stored.

Of these programs, the program for the functions allows the control part 11 to perform a process for a specific function. The program for a machine type exclusively used for a monochromatic printing and the program for a machine type capable of a color printing respectively allow the control part 11 to perform a control process for a monochromatic printer and a control process for a color printer.

The common program is a program with which the RAM 23 is initially loaded upon turning on a power (or upon rebooting). The common program allows the control part 11 (CPU 22) to perform a start-up process whose procedure is shown in FIG. 3, immediately after the common program is loaded. When the toner cartridge is replaced by another toner cartridge, the common program allows the control part 11 to perform an updating process for updating a machine type designating value, the procedure of which is shown in FIG. 4.

Initially, the updating process (FIG. 4) will be described.

Figure 4:
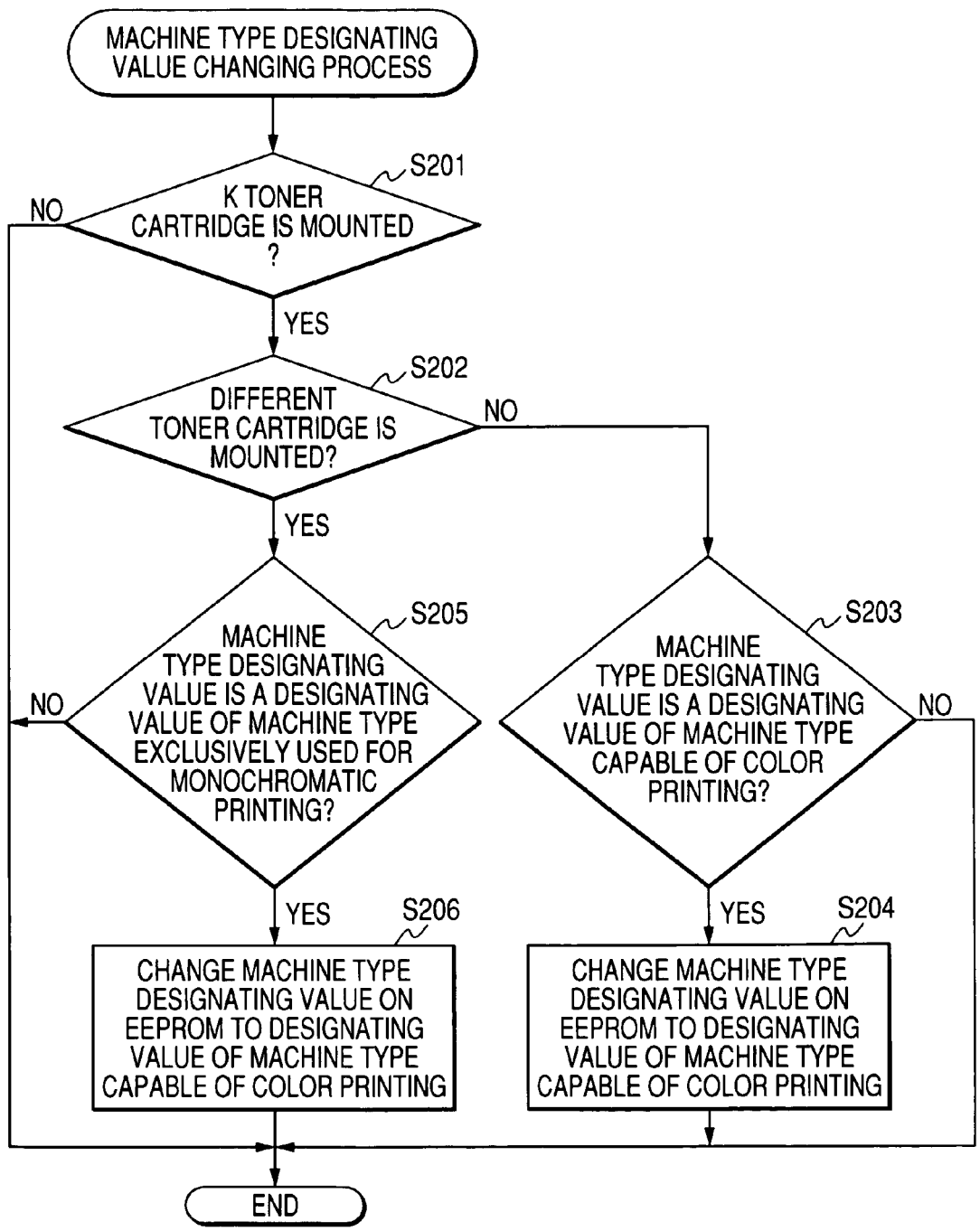
FIG. 4 is a flow chart of a machine type designating value changing process performed after the exchange of a toner cartridge is completed in the printer according to the embodiment.

As shown in FIG. 4, at the time of the updating process, the control part 11 firstly decides whether or not the K toner cartridge is mounted on the printing mechanism part 13 (step S201) When the K toner cartridge is not mounted on the printing mechanism part 13 (step S201; NO), the control part 11 finishes the updating process.

When the K toner cartridge is mounted on the printing mechanism part 13 (step S201; YES), the control part 11 decides whether or not a toner cartridge except the K toner cartridge is mounted on the printing mechanism part 13 (step S202) Then, when the toner cartridge except the K toner cartridge is not mounted on the printing mechanism part 13 (step S202; NO), the control part 11 decides whether or not the machine type designating value on the EEPROM 26 is a designating value for color printing (step S203). When the machine type designating value on the EEPROM 26 is the designating value of the machine type capable of a color printing (step S203; YES), the control part changes (step S204) the machine type designating value on the EEPROM 26 to a designating value for monochromatic printing. Then, the control part finishes the machine type designating value updating process. Further, when the machine type designating value on the EEPROM 26 is the designating value of the machine type exclusively used for a monochromatic printing (step S203; NO), the control part 11 finishes the machine type designating value updating process without rewriting the machine type designating value on the EEPROM 26.

On the other hand, when the toner cartridge except the K toner cartridge is mounted on the printing mechanism part 13 (step S202; YES), the control part 11 decides (step 205) whether or not the machine type designating value on the EEPROM 26 is the designating value of the machine type exclusively used for a monochromatic printing. When the machine type designating value on the EEPROM 26 is the designating value of the machine type exclusively used for a monochromatic printing (step S205; YES), the control part 11 changes (step S206) the machine type designating value on the EEPROM 26 to the designating value of the machine type capable of a color printing, and then, finishes the machine type designating value updating process. Further, when the machine type designating value on the EEPROM 26 is the designating value of the machine type capable of a color printing (step S205; NO), the control part 11 finishes the machine type designating value updating process without rewriting the machine type designating value on the EEPROM 26.

Now, the contents of the start-up process (FIG. 3) will be described below.

As shown in FIG. 3, the control part 11 starting the start-up process firstly reads a machine type designating value and a machine type ID (step S101) from the EEPROM 26. Then, the control part 11 decides whether or not the read machine type ID corresponds to the read machine type designating value (step S102).

Figure 5:
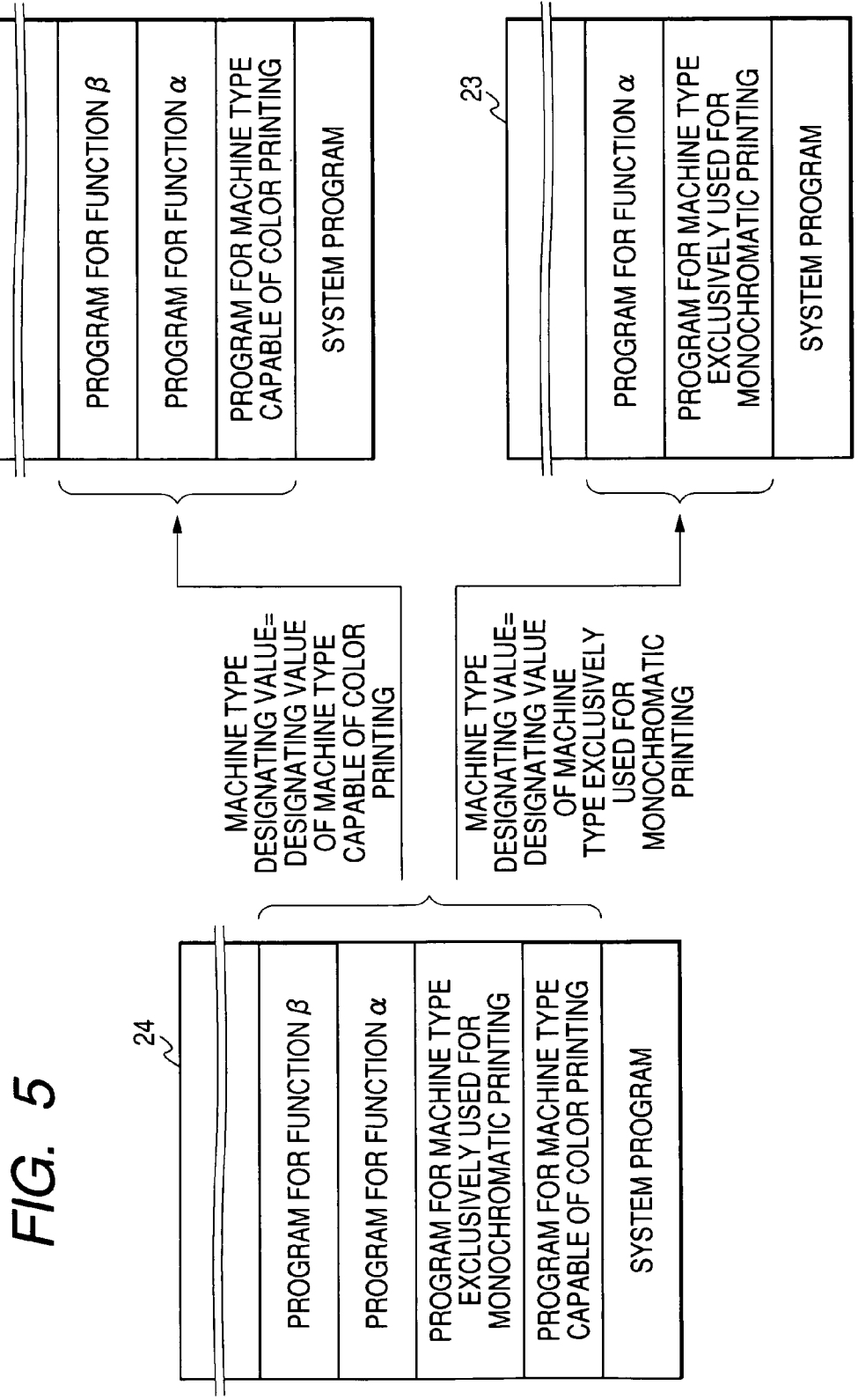
FIG. 5 is an explanatory view of a process performed at the time of the start-up process.

When the machine type ID does not correspond to the machine type designating value (step S102; NO), the control part 11 performs a process (step S103) for rewriting only information related to a machine type (the machine type ID, the device ID, the printer name, the MIB, the panel setting information and the color calibration data) on the EEPROM 26 to information corresponding to the machine type designating value. Then, the control part 11 performs a process (step S104) for loading the RAM 23 with a program for a machine type designated by the machine type designating value (a program for a machine type exclusively used for a monochromatic printing or a program for a machine type capable of a color printing) and a program for some functions. That is, in this step S104, as schematically shown in FIG. 5, a process for allowing the state of the RAM 23 to correspond to the machine type designating value is carried out.

On the other hand, when the machine type ID read from the EEPROM 26 corresponds to the machine type designating value read out from the EEPROM 26 (step S102; YES), the control part 11 performs the process of the step S104 without performing the process of the step S103. That is, in this case, the control part 11 loads the program for the machine type designated by the machine type designating value (the program for the machine type exclusively used for a monochromatic printing or the program for the machine type capable of a color printing) and the program for some functions on the RAM 23 without rewriting the information related to the machine type on the EEPROM 26.

The control part 11 that finishes the process of the step S104 operates in accordance with the program loaded on the RAM 23.

The contents of the operation of the control part 11 under this state are the same as those of a control part in an existing monochromatic printer or an existing color printer. However, when the machine type designating value indicates the designating value of the machine type exclusively used for a monochromatic printing, the control part 11 functions as a unit for performing a slightly different operation from that of the control part in the existing monochromatic printer.

Figure 6:
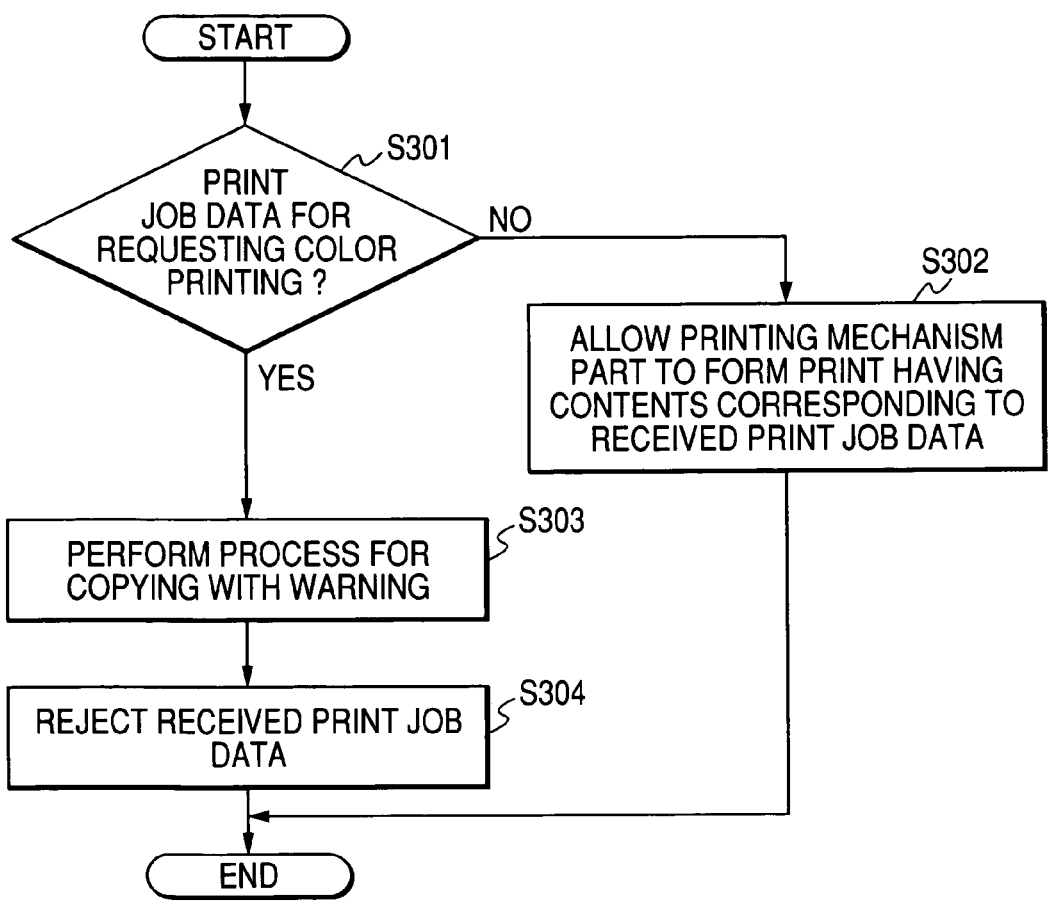
FIG. 6 is a flow chart of a process performed for received print job data in the printer according to the embodiment which operates as a machine type capable of only a monochromatic printing.

Specifically, when the machine type designating value indicates the machine type designating value exclusively used for a monochromatic printing, a group of programs with which the RAM 23 is loaded allows the control part 11 to process received print job data in accordance with a procedure shown in FIG. 6.

That is, the control part 11 initially decides (step S301) whether the print job data is data for requesting a color printing or a monochromatic printing on the basis of information (what is called a job control command) included in the top of the print job data which begins to be received.

Then, when the print job data is data for requesting a monochromatic printing (step S301; NO), the control part 11 performs a process for allowing the printing mechanism part 13 to form a print having the contents corresponding to the print job data in step S302 and completes the processes shown in FIG. 6.

On the other hand, when the print job data is data for requesting a color printing (step S301; YES), the control part 11 performs a process for coping with a warning in step 5303. Here, the process for coping with the warning means a process that a prescribed warning message representing that the print job data for requesting a color printing is received despite a state capable of only a monochromatic printing is displayed on a liquid crystal display of the control panel 12 and a self-state is brought into a state that status information is returned including information representing that the print job data is, rejected upon receiving a status information request command (a command transmitted by the monitor program).

The control part 11 that carries out the above-described process for coping with the warning performs a process (step S304) for deleting the received print job data, and then, finishes the processes shown in FIG. 6.

Briefly stated, when the machine designating value indicates the machine type designating value exclusively used for a monochromatic printing, the printer 10 of the present invention is designed in such a way that the print job data for requesting a color printing is processed so as not to interrupt the transmitting process of the print job data in a host computer side and not to perform a printing operation based on the print job data.

As described above, the printer 10 according to this embodiment is an apparatus that operates as either the printer of a machine type capable of a color printing or the printer of a machine type capable of only a monochromatic printer depending on its structure (depending on the kind of the toner cartridge mounted on the printing mechanism part 13). Further, the printer 10 serves as an apparatus whose outputted printer name is changed depending on as which machine type of printers the printer 10 operates (an apparatus for outputting the printer name corresponding to the machine type at that time) Accordingly, when the printer 10 of the present embodiment is used in a network environment, a user can grasp as which machine type of the printers the printer 10 of the present invention operates from the printer named is played on the display of the computer. As a result, the printer 10 of the present invention functions as a printer hardly erroneously selected irrespective of a fact that a printing operation of intended contents cannot be carried out.

Further, the printer 10 according to the present invention also serves as an apparatus whose outputted device ID is changed (an apparatus for outputting the device ID corresponding to the machine type at that time) depending on as which machine type of the printers the printer 10 operates. Accordingly, the printer 10 of the present invention serves as an apparatus capable of installing the printer driver (see FIGS. 2A and 2B) corresponding to the machine type at that time by a plug and play.

Further, when the printer 10 operates as the printer of the machine type capable of only a monochromatic printing, the printer 10 also serves as an apparatus for rejecting the print job data for requesting a color printing. Consequently, in the printer 10, when the printer 10 operates as the printer of the machine type capable of only a monochromatic printing, color print job data is erroneously supplied. In this case, a host computer and the printer 10 are not restricted due to a process for forming the print of unexpected contents. Further, the printer 10 also serves as an apparatus in which a window showing that the print job data is rejected is displayed on the display of the host computer. Thus, the user of the printer 10 can immediately recognize that an erroneous operation is carried out and can stop the transmitting process of the print job data if necessary.

MODIFIED EMBODIMENTS

The printer 10 of this embodiment may have various kinds of modifications. For examples the printer 10 is an apparatus in which the combined programs on the RAM 23 are different between a case in which the printer 10 operates as the printer of a machine type capable of performing a color printing and a case in which the printer 10 operates as the printer of a machine type capable of performing only a monochromatic printing. However, the printer 10 may be modified so that RAM 23 is loaded with the same program even when the printer operates as any type of the printers. In this case, when the printer 10 is modified as described above, a part of the program on the RAM 23 is not actually executed, thereby the storage capacity of the RAM 23 is wastefully used. Thus, the printer is desirably formed in the same manner as that of the above-described embodiment.

Further, information related to the machine type on the EEPROM 26 is not rewritten and two sets or more of information related to the machine type are stored on the EEPRQM 26 and the printer 10 may be modified so that the information related to the machine type corresponding to the machine type designating value is selected from among these information and used. Further, the structure of a self-device (the kind of the toner cartridge mounted on the printing mechanism part 13) is checked upon start-up process and the printer 10 may be modified so that the information related to the machine type on the EEPROM is rewritten. Further, the printer 10 may be modified so that the information related to the machine type on the EEPROM is rewritten when the toner cartridge is replaced by another toner cartridge.

Further, it is to be understood that a printer (a printer or a complex machine) functioning, for instance, as a printer of a machine type capable of performing a staple process and as a printer of a machine type incapable of performing a staple process may be realized on the basis of a technique used in the printer 10. Further, it is to be understood that some functions may be removed from the printer 10.

What is claimed is:

1. A printer comprising:
    a print performing unit which can change a structure thereof and in which contents of an executable printing process change depending on the structure;
    an apparatus name information storing unit which stores a plurality of apparatus name information as identification information of the apparatus coordinated with the structure;
    a request responding unit for transmitting the apparatus name information coordinated with the structure at that time when a prescribed request is received among the plurality of apparatus name information to an apparatus transmitting the request; and
    a rewriteable storing unit which stores a machine type designating value as information for designating any of the apparatus name information stored in the apparatus name information storing unit, wherein the request responding unit transmits the information designated from the plurality of apparatus name information by the machine type designating value stored in the rewriteable storing unit to the apparatus which transmits the request when the request responding unit receives the prescribed request.

2. A printer according to claim 1, further comprising: a rewriting unit for rewriting the machine type designating value stored in the storing unit to a value corresponding to a changed structure when the structure is changed.

* * * * *